United States Patent Office 2,985,573
Patented May 23, 1961

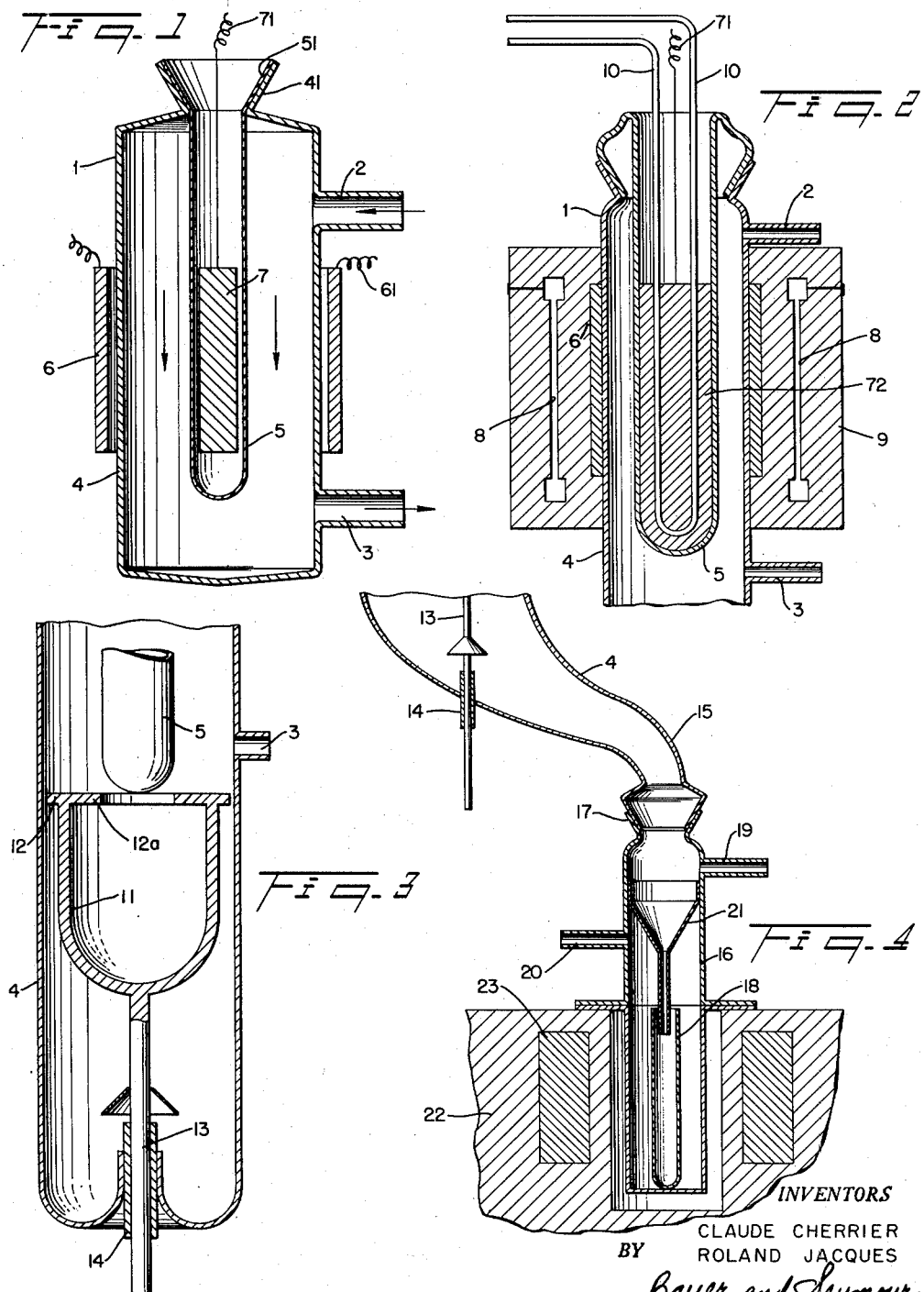

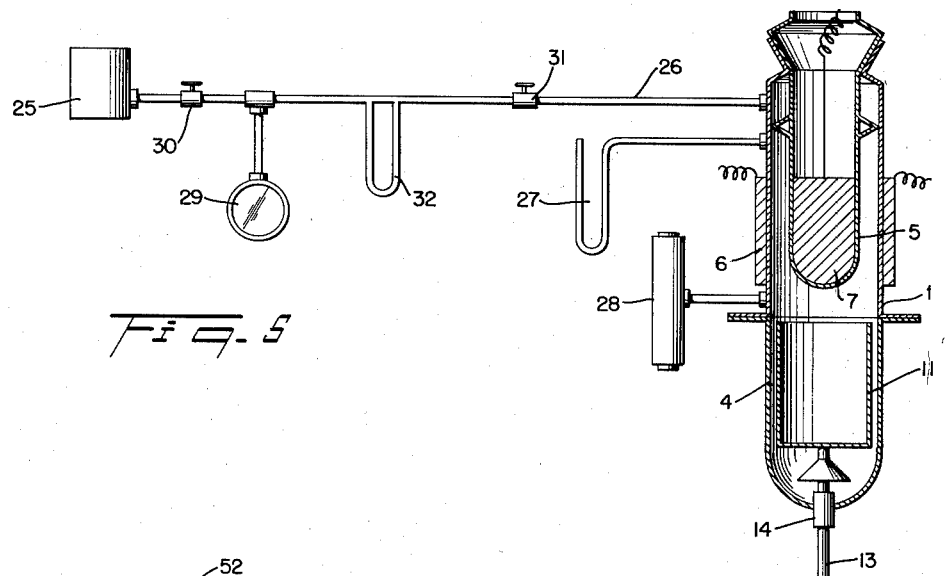
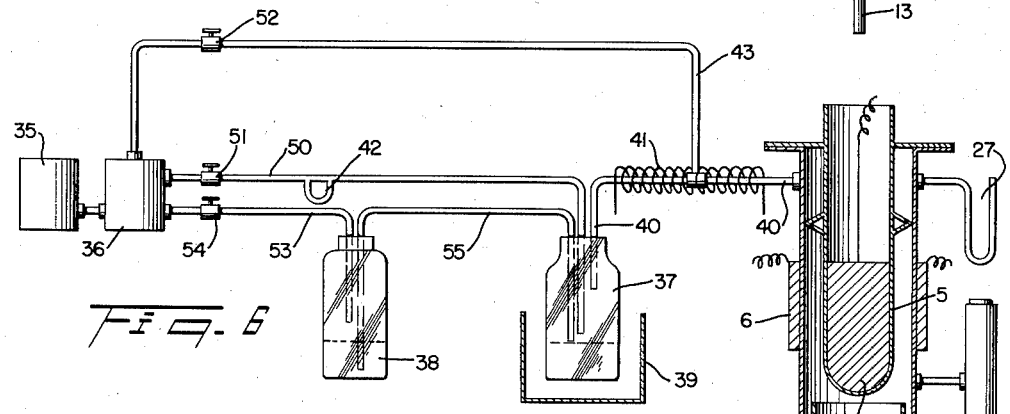
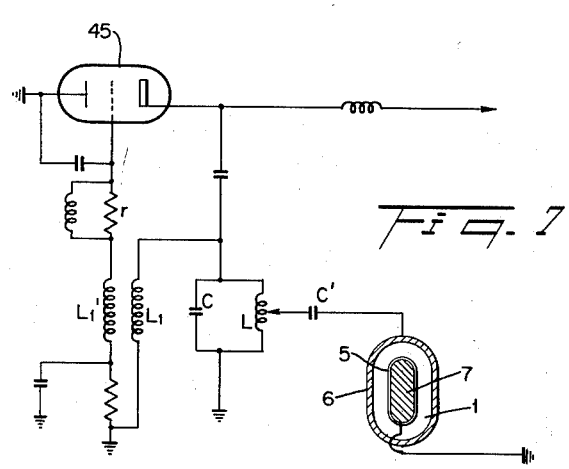

2,985,573

PREPARATION OF METALLIC ELEMENTS

Claude Cherrier, St.-Mande, and Roland Jacques, Pavillons-sous-Bois, France, assignors to Compagnie de Saint-Gobain, Paris, France Filed Apr. 22, 1958, Ser. No. 730,108

Claims priority, application France Apr. 30, 1957

12 Claims. (Cl. 204—164)

This invention relates to a method and apparatus for producing metals and elements of metallic character in a state of high purity.

The elements to which we refer are generally metals or metalloids, and they are generally those which are found in the 4th, 5th and 6th groups of the periodic table of the elements. In this specification we will use the term "metallic elements" or the term "elements of metallic character" as generic to all such elements.

The invention particularly concerns the manufacture of silicon, germanium, arsenic, antimony, selenium, tellurium, lead and bismuth in a state of high purity such as is desirable for application to the manufacture of photoelectric cells, transistors, and thermistors.

It is known in preparing these elements to use volatile compounds of the elements which are to be isolated, such as the halogenated or hydrogenated or alkylated elements. It is also known to produce these elements either by decomposing one of their volatile compounds, or by chemically reacting one of their volatile compounds in vapor phase with a gaseous reducing agent. In those known processes the decomposition or reaction is carried out under reduced pressure in a reaction chamber in which the gases are subjected to the action of electrical discharges which are produced by a coil which encircles the reaction chamber and is subjected to the passage of a high-frequency current. Electrodes in contact with the gases are not employed in those processes.

In the present case we use the term "disintegration" to include both the decomposition per se and the decomposition in the presence of a reactive substance.

It has been found, and this constitutes one of the objects of the present invention, that it is advantageous to produce the high-frequency electrical discharges in the volatile compound by means of a condenser having plates arranged to discharge through the reaction chamber. In this case also the plates or armatures of the condenser are preferably kept out of contact with the reaction mass.

It was discovered in operating the prior art processes that a thin layer of metal forms on the walls of the reaction chamber, forming a partial shield which reduces the efficiency of the high-frequency oscillations emitted through the reaction chamber by the induction coil. It is our discovery, forming part of this invention, that this conductive layer of metal has no apparent effect on the efficiency of the discharges produced by a condenser.

According to another characteristic of the invention, the reaction chamber is heated so that the temperature of the reaction chamber is carried to several hundreds of degrees centigrade, there being no reason to exceed 1000° C. This differs from the prior practice wherein the reaction chamber, because the reactions were subjected to cold luminescent discharges without electrodes, only reached low temperatures which increased but little as higher power was used in the coil.

The use of a condenser to produce the high-frequency discharge in the gas or the gaseous mixture has the advantage that the auxiliary heating can be accomplished easily and efficiently in the region of the reaction chamber where the discharge occurs by providing resistances or other convenient heating means in the vicinity of the exterior armature of the condenser.

The invention is particularly concerned with novel apparatus for carrying out the new method, and particularly includes means for preventing the formation of heavy layers of metal on the walls of the chamber, or the formation of needles of metal extending perpendicularly to the walls.

The invention also involves a novel condenser construction including the use of a metal plate.

The invention also includes the use of massive thermostats for the maintenance of temperatures. By the term "thermostat" we mean something which contributes to the maintenance of stable temperatures.

There is also involved at the discharge end of the reaction chamber a crucible in which the metal can be melted, which is provided with means for evacuation, means to maintain an inert atmosphere, and means to heat the crucible so that the powder may be melted to form an ingot.

Another object of the invention is to prepare a new condenser structure adapted to the novel method.

Another object concerns a method of preparing and delivering gases at a uniform rate to the reaction chamber and the maintenance of uniform conditions of reaction.

Another object involves an electrical apparatus for generating condenser discharges.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 is a diagrammatic view of a simple form of apparatus;

Fig. 2 is a diagrammatic vertical sectional view through a more complex type of apparatus;

Fig. 3 is a diagrammatic sectional view of means for mechanically scouring the reaction chamber during the course of the reaction;

Fig. 4 is a diagrammatic sectional view of apparatus for receiving the metal formed in the course of the reaction;

Figs. 2 and 4 are cognate;

Fig. 5 is a diagrammatic vertical sectional view through apparatus showing means for regulating the flow of gaseous material to the reaction chamber and for maintaining suitable operating conditions therein;

Fig. 6 is a diagrammatic vertical sectional view of an apparatus particularly adapted to reduction reactions; and Fig. 7 is a diagram, partly in horizontal section, of the electrical services of the condenser.

In the following description, for purposes of simplicity, we will contemplate the manufacture of extra pure silicon, but it is to be understood that this is merely representative and that what is said with regard to this element is equally true for other elements of metallic character.

In Fig. 1, a reaction chamber 1 is provided with an inlet 2 for a volatilized metal compound, or for a mixture of such compound with a reducing gas, and with a discharge port 3 from which unreacted or gaseous material may leave the chamber. The bottom of the reaction chamber forms a sump in which the metal may fall. The reaction chamber has an outer wall 4 and an inner wall 5, the latter being composed of an elongated cylindrical body which has a terminal 51 in the shape of a conic section which fits the conic section 41 established at the upper end of the reaction chamber 1. The two conic sections may be ground or otherwise provided with interfitting surfaces which form a seal when in engagement with each other. The inner and outer walls 4, 5 may be conveniently made of quartz or fused silica. The outlet 3 may be attached to vacuum in order to maintain the reaction chamber at a low pressure favorable to the reaction. The condenser, which provides for a discharge through the annular reaction chamber formed between the inner and outer walls, is composed of an exterior cylindrical armature or plate 6 which encircles the outer wall 4 and an inner armature or plate 7 which is placed inside the inner wall 5. Electrical connections 61, 71 are supplied from a generator of undamped waves or impulses of which the frequency may be between about 100 kHz. and 50 mHz. When the apparatus is put in action, it is scavenged by flowing an inert gas through it from inlet 2 to outlet 3 while the vacuum pump is applied. Thereafter, the volatile silicon compound is flowed through the chamber between the walls 4 and 5 and the condensers 6, 7 are made to discharge across the annular reaction chamber. Any unreacted or gaseous materials pass out through the outlet and solid powder falls into the bottom of the sump or forms on the walls of the chamber.

Fig. 2 represents a reaction chamber similar to that in Fig. 1 but with certain advantages of construction. In this figure the central plate 72 is composed of an alloy, which is fusible at low temperature, and a pipe 10 extends through it for admission of heating or cooling fluid. The reaction chamber and the outer condenser plate are encircled by a cylindrical thermostat 9 composed of a mass of carbon or graphite in which a resistance 8 is set. By this means the temperature of the reaction chamber can be maintained at the optimum. The surface of the interior wall 5, which contains the inner plate of the condenser, is heated more than the outer wall because of its lesser size, and it is therefore desirable to provide cooling fluid for the tube 10 to prevent too great a rise in temperature of the plate. Another reason exists for maintaining the low temperature of the inner plate, which is that, when the temperatures become too high, the inner tube 5 can be attacked by the deposited silicon. This temperature control is achieved by the use of a low-melting-point alloy as the inner plate and by circulating water through the tube 10. The water vaporizes and the temperature can be controlled by regulating the quantity of flow.

Fig. 3 is a schematic representation of an apparatus for scavenging the inner and outer walls of the reaction chamber, which permits one to reduce the thickness of the deposit on the walls. This comprises a shaft 13 which passes through a pipe joint 14 and supports a cylindrical receptacle 11 which is provided at its upper end with outer and inner flanges 12, 12a which act as scrapers for the respective outer and inner walls of the chamber. It is not necessary that the flanges scrape the walls clean, because of the phenomenon that condenser discharges are seemingly unaffected by moderate deposits of metal powder. The scrapers also prevent the formation of needle-like deposits of metal extending from one wall toward the other, which would shorten the path of condenser discharge in particular localities.

Fig. 4 shows collection apparatus for the reception of the metal which is formed in the reaction chamber. This figure may be considered cognate with Fig. 2, the upper portion of Fig. 4 being regarded as an extension of the lower portion of 4 in Fig. 2. A conduit 15 carries the metal to a funnel 21 in the top of a chamber 16 which is provided with a vacuum outlet 19 and a gas inlet 20 to which inert gas can be admitted if desired. The funnel 21 directs the metallic powder into crucible 18 where it is melted to form an ingot by a cylindrical resistance 23 mounted in a block of graphite 22 which surrounds the chamber 16. If we assume that silicon tetrachloride is under disintegration, the silicon will be received in crucible 18 and the chlorine fumes will be drawn off through vacuum outlet 19 or swept out by inert gas from inlet 20.

The disintegration of compounds of metal hydrides such as selenium preferably involves a somewhat more complex apparatus than that which has been described hereinabove. This apparatus is seen in Fig. 5 in which a source of silane or other metal hydride 25 is connected by means of a conduit 26 with the reaction chamber which has the usual inner and outer condenser plates, the inner of which may be composed of fused metal alloy and the outer of which may be composed of a refractory alloy. The inner alloy may be composed, for example, of 50% bismuth, 25% lead, 12½% tin, and 12½% cadmium, giving a fusion point of 70° C., which is an excellent temperature for efficient operation. The reaction chamber is connected directly to a mercury manometer 27. A vacuum pump 28 maintains a pressure of several centimeters of mercury in the reaction chamber. The conduit 26 is in communication with a pressure dome 29 of large dimension placed between two valves 30, 31, which absorbs any variations in flow of silane or hydride. A flow meter 32 indicates the rate of supply of gases to disintegration.

In making silicon, using a volatile compound such as silicon tetrachloride, which is to be reacted with a reductive gas such as hydrogen, an apparatus of the type shown in Fig. 6 is satisfactory. In this apparatus there is a source of hydrogen 35, which is purified in an apparatus schematically indicated at 36 and which is of any known type. The hydrogen travels through a pipe line 50 containing a valve 51 and a control manometer 42 to a vessel 37 mounted in a thermostat 39 which maintains the vessel at a temperature adequate to volatilize the silicon tetrachloride. The two gases, hydrogen and volatilized silicon tetrachloride, mingle in the upper portion of the vessel 37 and escape through a pipe 40 which passes through a heating coil 41, which prevents condensation of the volatilized gas, and into the upper part of the reaction chamber, from whence it pases downwardly between the plates of the condenser. A vacuum pump 28 maintains a pressure of a few centimeters of mercury in the chamber and withdraws gases which pass beyond the area of discharge and disintegration. The pipe line 43, having a valve 52, enables the operator to add additional hydrogen to the mixture flowing to pipe 40, if desired. The silicon tetrachloride in the vessel 37 is kept at a constant level by the regular and continuous introduction of the silicon tetrachloride from a reservoir 38 which can be maintained through pipe 53 and valves 54 under hydrogen pressure from purifier 36. A pipe 55 acts to carry the silicon tetrachloride from 38 to 37 and as a return flow if 37 becomes too full. Quartz piping may be used. Before the reaction begins, a flow of hydrogen through line 53 may be used to scavenge the apparatus of harmful gases.

Any source of high-frequency current may be used to charge and discharge the condenser across the gap constituting the reaction chamber, but a particularly efficient apparatus is shown in Fig. 7. This apparatus includes a triode tube 45, operating as a heterodyne with a tuned LC anode choke circuit. $L_1$ and $L'_1$ are the coupling coils between grid and anode. This generator can, for example, produce 30 kw. at frequencies ranging from 400 kHz. to 20 mHz. The reaction chamber 1 acts as a capacitance of small magnitude (in the order of 5 to 10 microfarads) wired in parallel with the anode oscillating circuit. The inner armature 7 is grounded and the outer armature 6 is conected through a capacitor $C'$ to an adjustable tap on inductance L of the LC circuit; adjustment of C' will adjust the impedance of the reaction chamber to the output impedance of the generator.

Hereinafter there are given two examples of the operation of the method and apparatus.

*Example 1*

Using an apparatus of the type illustrated in Fig. 5, of which the reaction chamber was composed of an outer tube 4 of ultra pure quartz, 100 mm. in diameter, and an inner tube, 80 mm. in diameter, of like material. The apparatus was 1 meter high. The external plate of the condenser was composed of superimposed sheets of a refractory alloy 35 cm. high. The high-frequency current used was produced by a 5 kw. generator with a frequency of 3 megacycles per second. The electrode 7 was composed of the alloy hereinabove described. The reaction chamber was supplid with silane at a pressure of 2 cm. of mercury. The rate, controlled by a pump, was 100 liters per hour of gas, computed at atmospheric pressure. The quantity of silicon recovered at the end of an hour of continuous operation was 115 grams, which indicated a yield of 80%, based on the silane decomposed.

It is to be understood that the silane not decomposed may be recycled to this reactor, or forwarded to another in the series which can be mounted in parallel with respect to the current supply from the generator.

It has been determined that whatever the power and the rate of supply, the yield in silicon deposited does not become smaller as a function of time, which is a signal advantage compared to prior methods using a coil discharge.

*Example 2*

Using an apparatus such as is illustrated in Fig. 6, of which the reaction chamber was composed of a quartz tube of 100 mm. diameter and 1 meter high, containing another quartz tube of 80 mm. diameter, the exterior condenser plate being constituted of sheets of a refractory alloy 50 cm. high, there was employed a high-frequency current produced by a 20 kw. generator with a frequency of 3 megacycles per second. The reaction chamber was supplied with silicon tetrachloride mixed with hydrogen at a pressure of 3 cm. of mercury. The flow, assured by a pump, was 120 liters per hour of $SiCl_4$ in gas phase and 1200 liters per hour of $H_2$, all computed at atmospheric pressure.

The quantity of silicon recovered after an hour of continuous operation was 98 grams, which indicated a yield of 66% with respect to the tetrachloride decomposed. The undisintegrated silicon tetrachloride, recovered in a carbon dioxide snow trap, distilled in a small quartz column to separate chlorosilane, and therefore possessing a higher degre of purity, can enter again into the reaction. As in the former example, no matter what the power and the rate of supply of gas used, the yield in silicon deposited does not decrease as a function of time.

As many apparently widely different embodiments of the present invention may be made without departing from the spirit and scope thereof, it is to be understood that the invention is not limited to the specific embodiments.

What is claimed is:

1. A method of liberating a metallic element, from the group consisting of Si and the metals of the 4th, 5th, and 6th groups of the periodic table, from the group consisting of hydrogenated, alkylated, and halogenated compounds of the metallic element, in vapor phase, which comprises passing through the compound in vapor phase, in a reaction zone between the plates of a condenser, at about the fritting temperature of the liberated metallic element and a pressure less than about 20 mm. Hg, high frequency condenser discharge generated by undamped A.C. of power between about 5 and 30 kw. at a frequency between about 400 kHz. and 20 mHz.

2. The method of claim 1 in which a gaseous reducing agent is present in the reaction zone in addition to that which may be liberated by decomposition of the vaporized metallic compound.

3. The method of claim 2 in which the gaseous reducing agent is hydrogen.

4. The method of claim 1 in which the condenser plates are out of contact with the reaction mass.

5. The method of claim 1 in which the reaction zone is heated between several hundred and a thousand degrees C.

6. The method of claim 1 in which the liberated metal is deposited on the walls of the reaction zone, and the layer is maintained thin and of uniform thickness.

7. In a method of claim 1 the step which comprises mixing the vaporized metallic compound with a gas inert to the metal before subjecting the vaporized compound to the discharge.

8. In a method of claim 1 the step which comprises mixing the vaporized metallic compound with a reducing gas before subjecting the vaporized compound to the discharge.

9. In the method of claim 1 the step which comprises mixing hydrogen with the vaporized metallic compound before subjecting it to the discharge.

10. A method of making silicon of high purity that comprises passing through a reaction zone between condenser plates a gaseous mixture of silicon tetrachloride and hydrogen at a pressure below about 20 mm. of mercury through an alternating condenser discharge generated by undamped waves of power about 5–30 kw. at a frequency between about 100 kHz. and 50 mHz. and maintaining the temperature in the discharge area at the fritting temperature of silicon.

11. A method according to claim 10 in which the condenser discharge is across a reaction zone bounded by solid masses adapted to receive and collect the liberated metal.

12. A method of preparing a metal in a state of high purity which comprises vaporizing a vaporizable compound of a metal from the group consisting of silicon and the metal of the 4th, 5th and 6th groups of the periodic table containing in combination with the metal at least one of the group consisting of hydrogen and halogen, establishing in the vaporized metallic compound a pressure less than about 20 mm. of mercury, passing an alternating current condenser discharge through the volatilized metallic compound, and maintaining the temperature of the freed metal at its fritting temperature.

References Cited in the file of this patent

UNITED STATES PATENTS

| | | |
|---|---|---|
| 1,900,573 | McArthur | Mar. 7, 1933 |
| 2,089,966 | Kassner | Aug. 17, 1937 |
| 2,388,824 | Brown | Nov. 13, 1945 |
| 2,676,145 | Weisz et al. | Apr. 20, 1954 |
| 2,724,692 | Akerlof | Nov. 22, 1955 |

OTHER REFERENCES

Gutmann et al.: Zeitchrift Aorg. U. Allegem. Chemie, vol. 278 (1955), pages 78–81.